US012754063B2

(12) United States Patent
Santos et al.

(10) Patent No.: US 12,754,063 B2
(45) Date of Patent: Oct. 6, 2026

(54) SYSTEM FOR WEIGHING MOVING MOTOR VEHICLES BASED ON FLEXIBLE SENSORS AND FIBER OPTICS

(71) Applicant: VELSIS SISTEMAS E TECNOLOGIA VIARIA S.A., Curitiba (BR)

(72) Inventors: Favero Guilherme Santos, Curitiba (BR); Emerson John Vieira Da Silva, Curitiba (BR); Fernando Kelvin Da Silva Soares, Curitiba (BR); Guilherme Dutra, Curitiba (BR)

(73) Assignee: VELSIS SISTEMAS E TECNOLOGIA VIARIA S.A., Curitiba (BR)

( * ) Notice: Subject to any disclaimer, the term of this patent is extended or adjusted under 35 U.S.C. 154(b) by 376 days.

(21) Appl. No.: 18/281,259

(22) PCT Filed: Mar. 7, 2022

(86) PCT No.: PCT/BR2022/050073
§ 371 (c)(1),
(2) Date: Sep. 8, 2023

(87) PCT Pub. No.: WO2022/187922
PCT Pub. Date: Sep. 15, 2022

(65) Prior Publication Data

US 2024/0151574 A1 May 9, 2024

(30) Foreign Application Priority Data

Mar. 10, 2021 (BR) ........................ 102021004560.4

(51) Int. Cl.
*G01G 19/03* (2006.01)
*G01G 3/12* (2006.01)

(52) U.S. Cl.
CPC ............. *G01G 19/03* (2013.01); *G01G 3/125* (2013.01)

(58) Field of Classification Search
CPC ...... G01G 19/03; G01G 3/125; G01G 19/022; E01F 11/00; G08G 1/01
(Continued)

(56) References Cited

U.S. PATENT DOCUMENTS 4,560,016 A * 12/1985 Ibanez .................. G01G 19/03
250/227.16
4,990,769 A 2/1991 Hazan et al.
(Continued)

FOREIGN PATENT DOCUMENTS

BR 0106699 A 8/2005
BR 102017005171 A2 10/2018
(Continued)

OTHER PUBLICATIONS

Agape, I., et al., "Actual of sensors used for weighing in motion" , IOP Conference Series Materials Science and Engineering, vol. 572 (1 ), 2019; 8 pages. DOI: 10.1088/1757-899X/572/1 /012102.
(Continued)

*Primary Examiner* — John E Breene
(74) *Attorney, Agent, or Firm* — Calderon Safran & Wright PC; Corinne Marie Pouliquen

(57) ABSTRACT

The present invention corresponds to a weigh-in-motion system for motor vehicles based on flexible, fiber-optic sensors. The field of application of the patent object is the measurement of dynamic physical events that are caused directly or indirectly by the passage of a motor vehicle over the sensors. This system consists of 5 blocks: an information processing and display equipment (5) is connected to an optical emission and detection equipment (2), one or more presence sensors (3), a temperature sensor (4), and one or
(Continued)

more weight sensors (1). It has advantages over other technologies, such as: simplified manufacture and compact size, sensors immune to electromagnetic interference, long service life, and the possibility of being installed on different types of pavement.

3 Claims, 6 Drawing Sheets

(58) Field of Classification Search
USPC .......................................................... 177/177
See application file for complete search history.

(56) References Cited

U.S. PATENT DOCUMENTS

| | | | | |
|---|---|---|---|---|
| 5,260,520 | A | 11/1993 | Muhs et al. | |
| 5,913,245 | A * | 6/1999 | Grossman | G01L 1/245 250/227.14 |
| 7,454,972 | B2 * | 11/2008 | Heyman | G01G 9/00 73/602 |
| 10,861,328 | B2 * | 12/2020 | Gonçalves | G08G 1/02 |
| 11,035,718 | B2 | 6/2021 | Goncalves | |
| 2004/0080432 | A1 | 4/2004 | Hill et al. | |
| 2006/0001863 | A1 | 1/2006 | Kishida et al. | |
| 2007/0031084 | A1 | 2/2007 | Wang et al. | |
| 2010/0175485 | A1 | 7/2010 | Dore et al. | |
| 2018/0340816 | A1 | 11/2018 | Hanson et al. | |
| 2024/0337522 | A1 * | 10/2024 | Santos | G08G 1/04 |

FOREIGN PATENT DOCUMENTS

| | | | |
|---|---|---|---|
| CN | 2924496 | Y | 7/2007 |
| CN | 200962255 | Y | 10/2007 |
| CN | 102155974 | A | 8/2011 |
| CN | 102252740 | A | 11/2011 |
| CN | 202066578 | U | 12/2011 |
| CN | 206618472 | U | 11/2017 |
| CN | 208254420 | U | 12/2018 |
| EP | 2372322 | A1 | 10/2011 |
| GB | 2056672 | A | 3/1981 |
| JP | 2011022064 | A | 2/2011 |
| RO | 127980 | A2 | 11/2012 |
| WO | WO200127569 | A1 | 4/2001 |
| WO | WO02065425 | A1 | 8/2002 |
| WO | WO03025524 | A1 | 3/2003 |
| WO | WO2019033185 | A1 | 2/2019 |

OTHER PUBLICATIONS

Caponero, M.A., et al., "Use of FBG sensors for bridge structural monitoring and traffic control", Proceedings vol. 5502, Second European Workshop on Optical Fibre Sensors, Santander, Spain, 2004; 5 pages. https://doi.org/10.1117/12,566649.

Hanto, D., et al., "Comparison study between static and dynamic response of optical fiber weight in motion sensor", Journal of Physics: Conference Series, vol. 817, 2017; 8 pages. DOI: 10.1088/1742-6596/817/1/012041.

Mendoza, J.C., et al., "Experimental study of temperature erosion tests on bidirecional coated and uncoated composites materials" , Materials Research Express, vol. 7, IOP Publishing, 2020; 12 pages. DOI: 10.1088/2053-1591 /ab69c3.

* cited by examiner

SYSTEM FOR WEIGHING MOVING MOTOR VEHICLES BASED ON FLEXIBLE SENSORS AND FIBER OPTICS

CROSS-REFERENCE TO RELATED APPLICATIONS AND CLAIM TO PRIORITY

This application is a national stage application of International Application No. PCT/BR2022/050073 filed Mar. 7, 2022, which claims priority to Brazilian application Ser. No. 102021004560.4 filed Mar. 10, 2021, the disclosures of which are incorporated herein by reference and to which priority is claimed.

FIELD OF THE INVENTION

The present invention relates to a weigh-in-motion system for motor vehicles based on flexible sensors and fiber-optic. Its field of technical application corresponds to that of systems for measuring dynamic physical events that are caused directly or indirectly by the passage of a motor vehicle over its sensors. The aim of the invention is to monitor road traffic variables such as (but not limited to): detecting vehicles, counting wheels, identifying single and/or double wheelsets, measuring weight per wheel, measuring weight per axle, measuring the weight of groups of axles, measuring the total weight of vehicles and measuring pavement mechanical parameters. The solution proposed by the present invention has a number of advantages, including: a simplified manufacturing process and a compact size, sensors that are immune to electromagnetic interference, a long service life and the possibility of being installed on different types of pavements.

BACKGROUND OF THE INVENTION

Monitoring traffic parameters is used in the areas of road safety, traffic control, maintenance and infrastructure, diagnosing traffic problems, pricing on toll roads and imposing fines in irregular traffic situations, among many other scenarios. The information generated is used by different agents in society, such as government bodies responsible for the road sector, regulatory agencies, public safety entities, road concessionaires and, in some cases, road users themselves. The constant evolution of road parameter monitoring techniques is relevant and brings benefits to society.

As known technical experts in the field of weigh-in-motion, the movement of a vehicle on the pavement generally causes physical effects which, when monitored, generate information about the vehicle's characteristics. These characteristics are related to the constructive aspects of the vehicle, such as weight, dimensions, number of wheels and axles, among others, and to the use of the vehicle that is moving over the pavement, including speed, acceleration, load, number of passengers, among others. Currently known methodologies for detecting and measuring physical parameters involving vehicle traffic are magnetic detection, image detection, optical sensor detection, radar detection, vibration detection, deformation detection and temperature detection.

In some cases, a road traffic monitoring system uses a combination of two or more of the methodologies described above to generate as much information as possible, or even to reduce the uncertainties intrinsic to a given technology by combining the data captured.

In order to guarantee measurement with low uncertainty of a given variable of interest, the most common technique adopted, whatever the technology applied, is to have as many data readings as possible, so as to have a larger sample and consequently greater precision.

In the case of weighing in motion, both techniques are commonly used: the combination of different sensors (generally inductive loops in combination with piezoelectric sensors or load cells) and the installation of a greater number of sensors when greater precision is desired.

In general, a moving vehicle is weighed by measuring the deformations or vibrations exerted on the road surface. The main differences between measurement methodologies for fiber optic-based sensors, whether reported in the literature in the form of patents or technical articles, relate to the types of sensor elements and their encapsulation. The types of sensor elements vary depending on the type of quantity to be measured, such as intensity, frequency and/or phase, or wavelength of the optical wave. The encapsulation, in turn, consists of the protective element and, above all, the mechanical transduction element responsible for transforming and/or amplifying the force components related to the vehicle's weight.

Some patent registrations in the area of traffic monitoring with fiber optic sensors can be found in patent databases.

In Australian patent WO2001027569A1, the optical fiber is fixed to a substrate, a deflection plate, which deforms as vehicles pass by and the detection of the optical fiber deformation is based on interferometric measurement.

In British patent GB2056672A, the optical fiber is placed next to and across the path where the vehicle passes.

U.S. patent Ser. No. 12/376,875 uses a strain gauge consisting of a fiber optic Fabry Perot interferometer.

European patent EP20110160916 uses a flexible plate with fiber optic diffraction networks to measure weight.

In the U.S. patent Ser. No. 07/410,764 the optical fiber is installed between rigid and semi-rigid plates to measure pressure through the deformation/bending of the plates.

In the U.S. patent Ser. No. 11/425,392 diffraction networks are connected to a mechanical structure.

In the U.S. patent Ser. No. 10/467,075 a sensor is installed on the road with interferometric detection by Rayleigh backscattering.

U.S. Pat. No. 5,260,520 reports the encapsulation of optical fiber by elastomeric material, which is the transduction element. One of the major problems with this type of material is its dependence on temperature, which alters deformation rates. At higher temperatures, such as those found on pavements, the material can saturate before the end of the measurement scale, thus restricting the sensor's operating range.

U.S. Pat. No. 5,260,520 discloses a device for weighing moving vehicles that is supplied by a plurality of elongated fiber optic sensors defined by an optical fiber embedded in an elastomeric material encapsulation and arranged parallel to each other on the road in the path of the moving vehicles. Each fiber-optic sensor is provided with contact media arranged in a grid that can be selectively altered to have adequate sensitivity for each vehicle weight range. Switch systems are used in conjunction with the fiber optic sensors to provide signals indicating vehicle speed, weight distribution, tire position and wheelbase. The use of an N-shaped switch configuration also facilitates the determination of the number of tires on each axle, and the tire tread on the ground. When the switches in this configuration are made up of optical fibers, the extent of light transmission by the fibers in contact with the vehicle's tires is indicative of the vehicle's weight.

Chinese utility model CN200962255 discloses a fiber vehicle detector comprising a light source, fiber optic sensor unit, detector, data acquisition unit and processing unit, wherein the fiber optic sensor unit comprises two Mach-Zehnder interferometric sensors comprising a stainless-steel bar and a lighter plastic sheet of standard shape. The bar can detect the road vibration signal while the sheet acts as a reinforcement under the road surface. The beneficial effects are improved sensitivity and blocking of electromagnetic interference on the detector, with no effect from the environment, and improved signal-to-noise ratio by adding the stainless-steel bar and lighter plastic sheet to interferometric sensors, where one arm of the sensor is always the reference arm and the other is the signal arm. In addition, the reference arm is immobile and corresponds to the protective enclosure, as is the rejection of the common mode of the differential amplifier in the electronic circuit when the stainless-steel bar and the lighter plastic sheet vibrate together.

Romanian patent RO127980 refers to a method for determining the weight of motor vehicles in motion without restricting in any way the traffic of the vehicles to be weighed and to a device that applies the method. The method measures the variation of the optical power transmitted by an optical fiber depending on the variable weight applied, using an opto-electronic device with a single-mode or multiple-mode optical fiber when there is propagated a light radiation with the infrared spectral gamma wave emitted in a continuous wave regime by a laser diode or an LED, the optical fiber is mounted on a mechanical device that ensures its curvature depending on the weight to be measured. The claimed device comprises a source of radiation in the near infrared spectrum that can be a laser diode or an LED, said laser diode or LED emitting the infrared radiation through an optical fiber bent under the weight of the motor vehicle to be weighed, the micro-bending of the fiber caused by the weight causing a change in the transmission of the light emitted through the fiber, proportional to the weight of the vehicle on the asphalt.

Brazilian patent PI0106699 describes a piece of equipment whose main purpose is to provide an automated mechanism for the supervision and inspection of traffic lanes intended for the exclusive use of certain types of vehicles (public transport, official vehicles, etc.). Its function is to identify and record, through digitized images, unauthorized vehicles that are traveling on the exclusive lanes. It is characterized by having vehicle detectors that collect data through sensors, allowing the presence of a vehicle to be identified at a given place and time, as well as its characterization in terms of length parameters and optionally, weight, height, speed and other information concerning the detected vehicle. The data captured by the vehicle detector is transmitted electronically to a local computer. The local computer receives the data from the vehicle detectors, the images from the video cameras, processes them and feeds a database with the information received and processed. The local computer is capable of operating simultaneously with several vehicle detectors and video cameras. The equipment covered by PI0106699 is characterized by using a communication medium that allows data to be exchanged between the local computer and the central processing unit. The means of communication corresponds to any commercially used technology that allows the interconnection of computers, such as common telephone lines, fiber optics, private lines, radio transmission, local or remote computer network connections, among others. The equipment covered by PI0106699 is also characterized by having a central processing unit that carries out the final processing of the information collected on the local computer. The processing center has the capacity to simultaneously process information from several local computers, and its size varies from a single computer to several computers and other accessories in a computer network. The end product of the equipment covered by patent PI0106699 is the processing center's real-time remote supervision of vehicles, automatic identification of vehicles, especially those whose characteristics captured by the vehicle detector do not match the standards allowed for traffic (identification of offending vehicles), generation of information for issuing infraction notices (fines) including the digitized image of the vehicle at the place and time of the occurrence, the registration data of the vehicle with its license plate identified through the image (by manual typing or automatic recognition when using automatic character recognition tools), the issuance of infraction notices, the generation of data and statistical reports for studies of the behavior and use of the monitored region, among other information that can be easily generated by processing and cross-referencing the information obtained.

U.S. Pat. No. 4,560,016 discloses a method and apparatus for measuring the weight of a moving vehicle, where an optical fiber is embedded in a matrix, such as a rubber mat, and a multiplicity of micro-folding fastening devices are distributed along the path of the optical fiber. Thus, as the wheels of a vehicle pass over the mat, the force of the wheels causes the micro-folded fasteners to compress together and attenuate the light that is transmitted through the optical fiber. The light transmitted through the optical fiber from a light source at one end of the fiber is received by a light receiver at the other end of the optical fiber. Then, by measuring the amount of light input and the net amount of light output and calibrating the device, the weight of each axle and the weight of the vehicle above that axle can be measured.

Chinese patent CN2924496 discloses a device for dynamic vehicle axle weighing by optical fiber grating, which comprises a laser source. The output terminal of the laser source is connected to a first end of the fiber coupler, and a third end of the fiber coupler connected to the fiber grating wavelength module, photoelectric conversion module, data acquisition equipment and industrial PC. The hydraulic pressure sensing element consists of the fiber grid pressure sensing head, hydraulic valve assembly and hydraulic hose. The fiber grid pressure sensing head is made of epoxy polyester to hold the fiber on both sides of the sensing grid in a flexible metal shim, and the shim is connected to the hydraulic valve assembly which is communicated with the hydraulic hose.

Chinese patent 206618472 discloses a multi-stage optical fiber grating weighing sensor based on a telescopic rod structure comprising the multiple light source sensing box body structure, optical splitter, optical power meter, demodulation light path and telescopic link. Where the internal structure of the box includes: upper weighing plate, support spring, position control hole, clamp, lever post, cantilever beam, telescopic link. The surface is glued, respectively, and has a fiber grid over the cantilever beam. Weight load causes the cantilever beam to deform, transmitted through the telescopic link, and changes in the demodulation light output energy value allow the weight to be measured by calculation. The design of the sensor is multi-stage, with the addition of load mass and operating conditions respectively entering different levels to be provided with the overload protector. This structure has succeeded in improving the measurement range by guaranteeing the resolution power of the sensor's measurements.

Chinese patent CN208254420 discloses a distributed optical fiber equipment for measuring ground deformation, configured on the optical fiber end, aligned with the fixed anchor plate of a plurality of optical fibers at the bottom of the optical fiber end, the fixed anchor plate of the optical fiber being the reference point, to be equipped with sensing fiber hole and temperature measuring optical fiber hole in the optical fiber fixed anchor plate, so that it moves along with the soil to realize the real-time load measurement through the sensing fiber and the temperature variation so as to realize the temperature compensation correction, the internal deformation that the soil reaches.

The technologies disclosed by the currently existing patents, in relation to the technology of the present patent, have limitations, drawbacks and disadvantages:

In patents WO2001027569A1, EP20110160916, U.S. Ser. No. 07/410,764 and U.S. Ser. No. 11/425,392 the measurement methodologies employ mechanical transducers based on deflection plates to transform the weight force into mechanical deformation of the optical fiber. In general, this type of sensor has large dimensions, is highly intrusive to the pavement, has highly demanding geometry requirements in terms of installation and is also complex to manufacture.

Patents GB2056672A and RO127980 use the measurement of the variation in the luminous intensity of the light that travels through the optical fiber as the measurement method. The intensity variation occurs by throttling the optical fiber by means of a mechanism with the passage of a vehicle over the fiber. This technique is susceptible to fluctuations in the optical source and detection components, as well as cables and connections, and is therefore inaccurate and unusable in metrological systems.

U.S. Ser. No. 10/467,075 discloses the use of a distributed acoustic measurement system for monitoring road parameters. This technique is based on measurements of acoustic emissions from vehicles and the interaction of vehicles with the pavement.

U.S. Pat. No. 5,260,520 reports the encapsulation of the optical fiber by elastomeric material, which is the transduction element. One of the major problems with this type of material is its dependence on temperature, which alters deformation rates. At higher temperatures, such as those found on pavements, the material can saturate before the end of the measurement scale, thus restricting the sensor's operating range.

Patent CN 20096255 uses a mechanical transducer based on a stainless-steel plate and polymer bar to detect vibration. This design is highly complex mechanically, has a high temperature dependence and is large in size and therefore highly intrusive on the pavement.

More recently, the applicant of the present patent filed the Brazilian patent BR 102017017613-4 called "System for monitoring dynamic weighing and speed of vehicles on lanes" which disclosed fiber optic technology in unique mounting configurations with point and quasi-distributed sensors, which allow rapid response, for the measurement of deformation, vibration, temperature and pressure, be encapsulated in order to enhance sensitivity to the variables of interest, employ specific materials and can be installed with advanced configurations of optical networks, They can be encapsulated to enhance sensitivity to the variables of interest, facilitate the installation process and/or protect the sensing optical fiber, use specific materials and can be installed with advanced optical network configurations, with the advantages of lower cost and longer service life compared to others; the sensors can be multiplexed; they have high spatial resolution across the pavement; the manufacturing technology is simple and inexpensive and transferable in terms of associated costs. The patent presented differs from patent BR 102017017613-4 in three main aspects: the use of a continuous sensor rather than a point based quasi-distributed sensor; the physical effect on which the measurement is based is interferometric, rather than time of flight and measurement of wavelength variation; and, finally, it presents a significant evolution in the method of manufacturing and assembling the weight sensor, which reduces costs and increases the yield of the manufacturing batch.

SUMMARY OF THE INVENTION

"IN-MOTION WEIGHING SYSTEM FOR MOTOR VEHICLES BASED ON FLEXIBLE SENSORS AND FIBER OPTIC", the subject of this patent, was developed to overcome the limitations, drawbacks and disadvantages of existing technologies for dynamic weighing, monitoring physical variables on roadways, through a sensor that uses guided optical interferometry for measurement and built in composite material such as carbon fiber, glass or aramid of any weight or weave, to enable measurements of parameters with high precision in a more reliable and simple way, with the advantages of being able to be installed and molded into any pavement, minimally intrusive, low interference, low cost, long service life, multiplexable, and making use of a simple manufacturing technology at a lower cost than that demonstrated in the state of the art.

The sensor in this patent solved the following technical problems:

A) Current sensors, when installed on roads due to traffic, suffer wear and tear. Solved by the present invention through a system composed of composite material and optical fiber, their wear occurs as the road wears. This feature minimizes the chance of exposing metal edges or corners on the road that could destabilize passing vehicles, thus increasing safety.

B) Current sensors suffer from electromagnetic interference due to their method of operation, with metal and electricity-based components. This is solved by the present invention through sensing elements that are immune to conducted or radiated electromagnetic interference, due to the inherent characteristics of optical fiber, unlike other technologies that work on the basis of metallic conductors.

C) Current sensors need to be installed close to the weighing system due to interference and noise in their transmission. This is solved by the present invention through sensors with low attenuation, less than 0.05 dB/km, due to fiber optics.

D) Current sensors have poor security against attacks and interference from third-party equipment, which can alter their measurements. The present invention solves this problem by modulating the signal, which acts as an additional security layer.

BRIEF DESCRIPTION OF THE DRAWINGS

The following figures are attached for a better understanding of the present patent.

DETAILED DESCRIPTION OF THE PREFERRED EMBODIMENT(S)

The sensor in this patent also has the following advantages:

- Simple production method;
- Compact size;
- It works by detecting the phase of the optical wave and does not suffer from interference;
- Long service life;
- Can be installed and integrated into any type of road surface; and
- Made of a material that is not harmful to vehicles when removed from the pavement.

Figure 2:
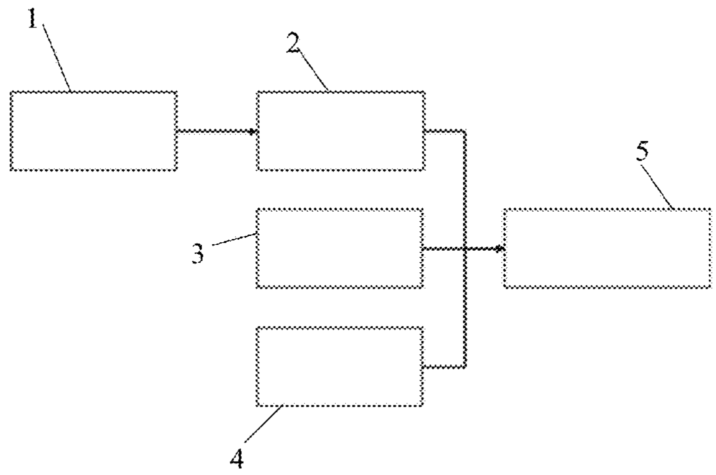
FIG. 2 shows the general block diagram of the system covered by this patent.

According to FIG. 2, the in-motion weighing system for motor vehicles based on flexible sensors and fiber optic is made up of weight sensor(s) (1) connected by a multipath optical cable (C) to an optical emission and detection equipment (2); optical emission and detection equipment (2), connected in parallel to a presence sensor(s) (3), and a temperature sensor (4) and all are connected to an information processing and display equipment (5).

Figure 1:
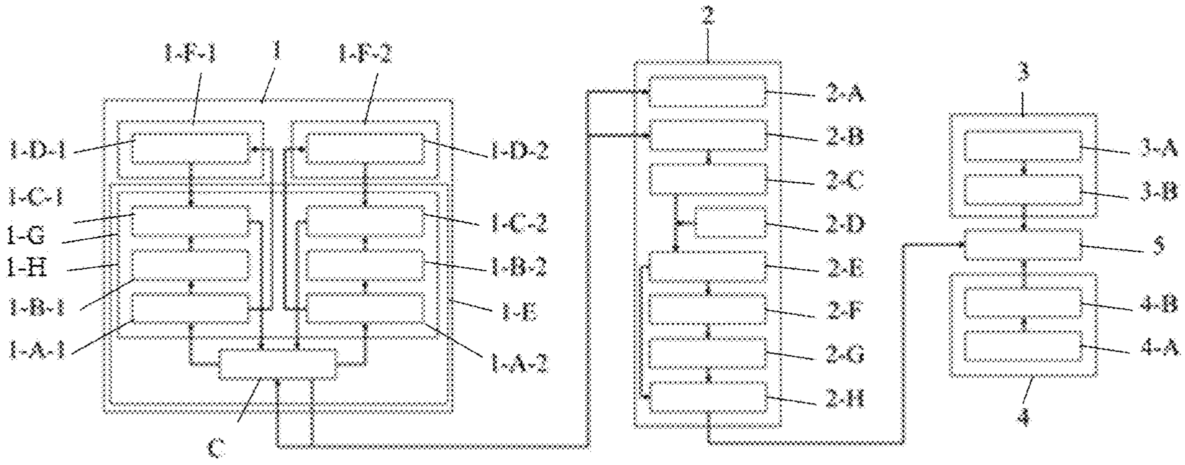
FIG. 1 shows the detailed block diagram of the system covered by this patent.
Figure 6:
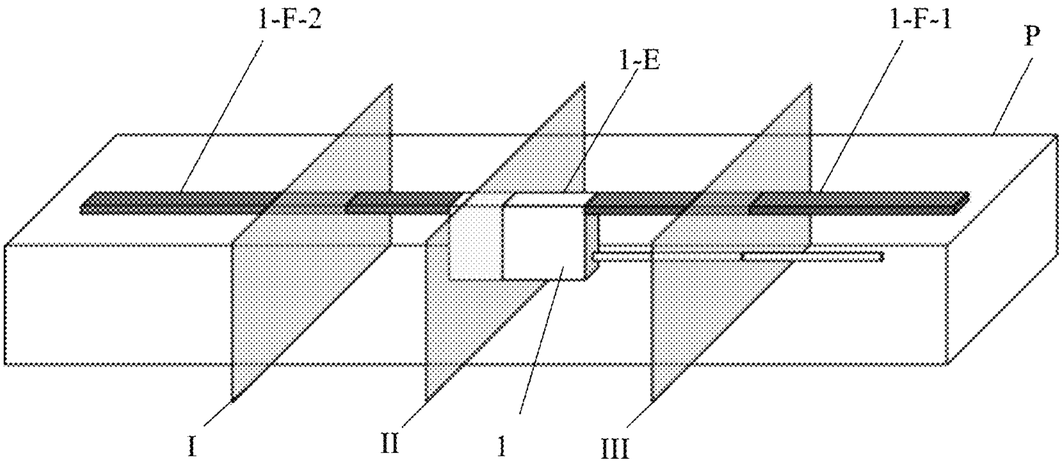
FIG. 6 shows the transparent perspective view of the weight sensor (1) of the present patent installed on the pavement (P)
Figure 7:
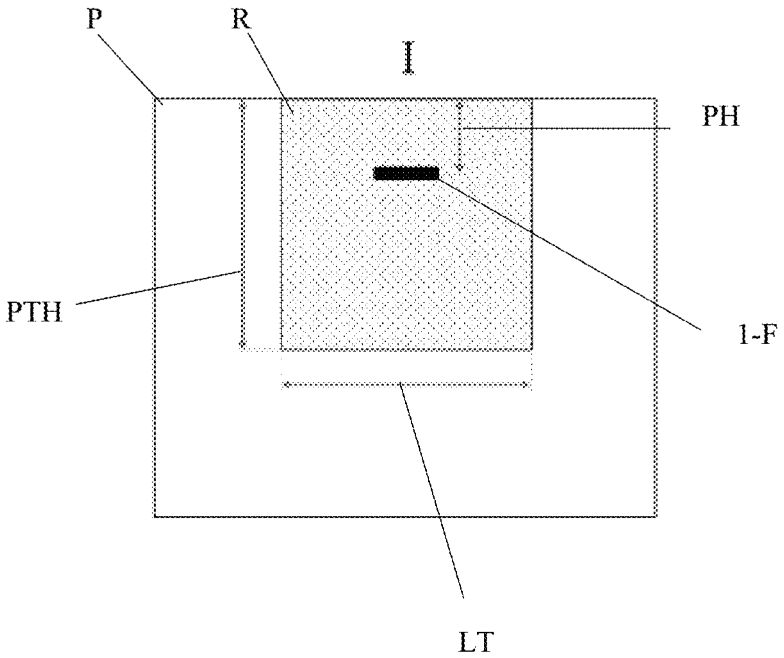
FIG. 7 shows the cross-sectional view I of FIG. 8, of the weight sensor (1) of the present patent.
Figure 8:
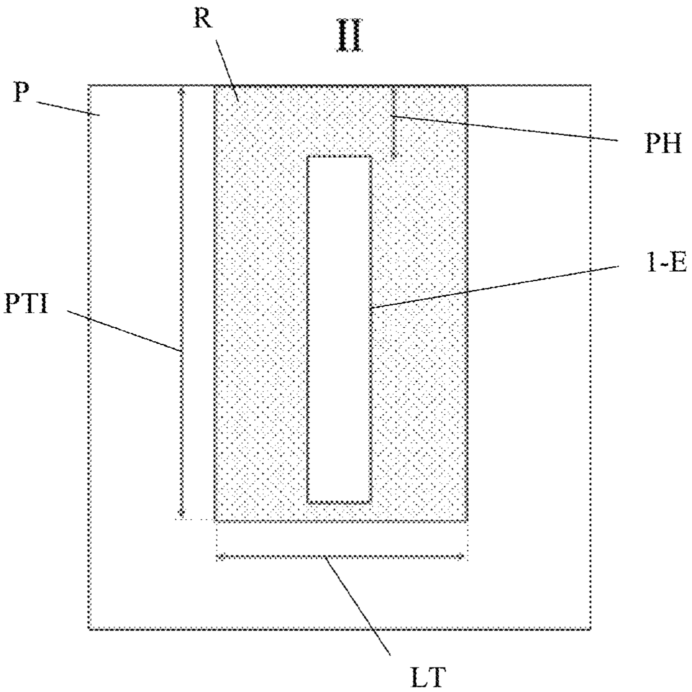
FIG. 8 shows the cross-sectional view II of FIG. 8, of the weight sensor of (1) of the present patent.
Figure 9:
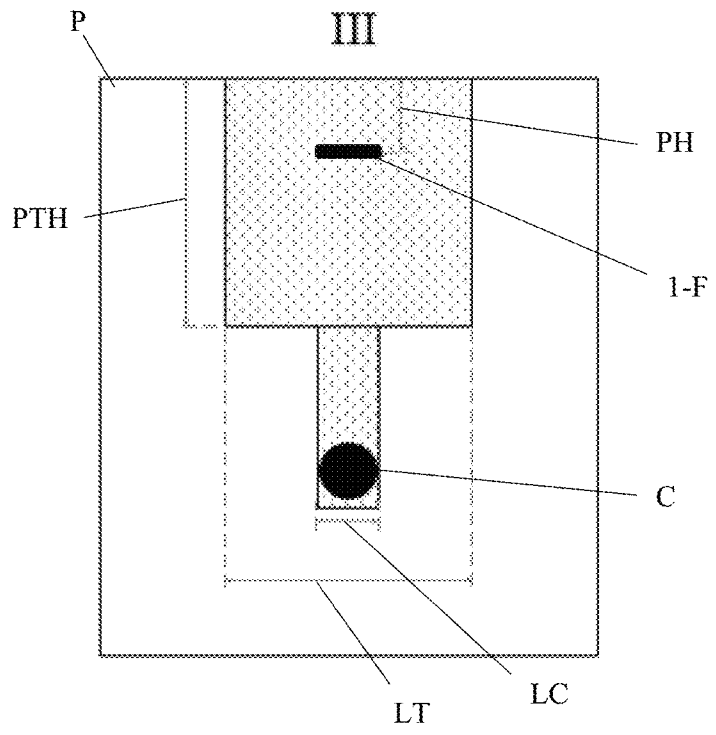
FIG. 9 shows the cross-sectional view III of FIG. 8, of the weight sensor (1) of the present patent.

As shown in FIGS. 1 and 6, a weight sensor (1) consists of a right input optical coupler (1-A-1) and a left input optical coupler (1-A-2) of the double taper coupler or planar waveguide coupler type, but not limited to these, connected unidirectionally to a right optical reference (1-B-1) and a left right optical reference (1-B-2), a right optical sensor (1-D-1) and a left optical sensor (1-D-2) and via a multipath optical cable (C) to a photoemitter (2-A); a right optical reference (1-B-1) and a left optical reference (1-B-2), made of optical fiber material, connected unidirectionally to the right input optical coupler (1-A-1) and left input optical coupler (1-A-2) and to a right output optical coupler (1-C-1) and a left output optical coupler (1-C-2); a right output optical coupler (1-C-1) and a left output optical coupler (1-C-2), of the double taper coupler or planar waveguide coupler type, but not limited to these, connected unidirectionally to the optical references (1-B-1) and (1-B-2), to the optical sensors (1-D-1) and (1-D-2) and via the multipath optical cable (C) to a photodetector (2-B); a right optical sensor (1-D-1), of the single or multi-mode optical fiber type, connected unidirectionally to the right input (1-A-1) and right output (1-C-1) optical couplers, and a left optical sensor (1-D-2), of the single or multi-mode optical fiber type, connected unidirectionally to the left input (1-A-2) and left output (1-C-2) optical couplers; an enclosure (1-E) made of a choice of metal, plastic or composite material, filled with a siliconized rubber damping material (1-G), which protects and insulates the sensor's reference components: input optical couplers (1-A-1) and (1-A-2), optical references (1-B-1) and (1-B-2), and output optical couplers (1-C-1) and (1-C-2) from vibrations and impacts; such reference components are mounted on a tray (1-H); a right flexible rod (1-F-1) and a left flexible rod (1-F-2) made of resin and fiberglass, carbon or aramid composite material are fixed to the enclosure (1-E); the weight sensor (1) is connected to an optical emission and detection equipment (2) via a multipath optical cable (C).

As shown in FIG. 1, an optical emission and detection equipment (2) consists of a photoemitter (2-A) of the light-emitting diode LED or laser diode type, but not limited to these, connected unidirectionally to the right (1-A-1) and left (1-A-2) input optical couplers via a multipath optical cable (C); a photodetector (2-B), of the avalanche type, but not limited to this, connected to an output optical coupler (1-D) of the weight sensor (1) via the multipath optical cable (C); a high-pass filter (2-C), of the active or passive type, analog or digital, connected after the photodetector (2-B); a clamper (2-D), active or passive, analog or digital, connected after the high-pass filter (2-C); a buffer (2-E), active or passive, analog or digital, connected to the damper (2-D); a peak follower (2-F), active or passive, analog or digital, connected to the buffer (2-E); a reference generator (2-G), active or passive, analog or digital, connected to the peak follower (2-F); and a Schmitt trigger (2-H), active or passive, analog or digital, connected in parallel to the buffer and reference generator (2-G).

Figure 3:
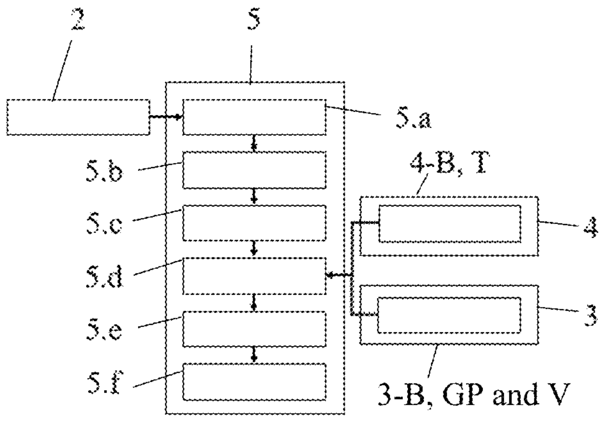
FIG. 3 shows the block diagram of the software process carried out by the system of the present patent.

A presence sensor (3), which consists of a presence probe (3-A), of the inductive loop type, but not limited to this, connected to a processor (3-B) which interfaces with the variables provided by a presence trigger (GP) and a speed (V) trigger, as shown in FIGS. 1 and 3.

A temperature sensor (4) consists of a temperature probe (4-A), of the digital or analog thermometer type, but not limited to these, which is connected to a processor (4-B) that interfaces the temperature variable (T), as shown in FIGS. 1 and 3.

An information processing and display equipment (5) connected to the emission and detection equipment (2), presence sensor (3) and temperature sensor (4) and consists of an information processing machine, computer or dedicated system with a processor with a recorded logic program. This machine contains a logic program specially developed for the operation of the system covered by this patent. The program interfaces frequencies, signals emitted by sensors, generating the data and results desired by the inventor.

The computer program is inserted into the information processing and display equipment (5), and its process is as follows (FIG. 3):

5.*a*) The binary signal coming from the Schmitt trigger (2-H) is captured via an analog-to-digital converter or edge-sensitive input pins. The instantaneous frequencies of the phase-varying signal, which are the inverse of the time difference between the rising and falling edges of this signal, are stored in a frequency vector;

5.*b*) A peak frequency detection algorithm is applied to the frequency vector, which describes the exact moment when a wheel/axle is over the weight sensor (1). The detected peak frequency is time-stamped and a duration window, fixed or not, is opened around it;

5.*c*) Each windowed wheel/axle is integrated and the value resulting from the integration is an input variable for the weight estimation curve;

5.*d*) With the integration values obtained in 5.*c*), the temperature variable (T), obtained by processor (4-B), and the speed (V), obtained by processor (3-B), the axle weight is calculated;

5.*e*) With the axle weight values obtained in 5.*d*) and the distance between axles, it is possible to calculate the weight per axle group; and 5.*f*) Finally, with the weight values per axle group, obtained in 5.*e*), and the moments when the vehicles start and end temporally, presence triggers (GP), obtained by processor (3-B), it is possible to calculate the total gross weight.

Figure 5:
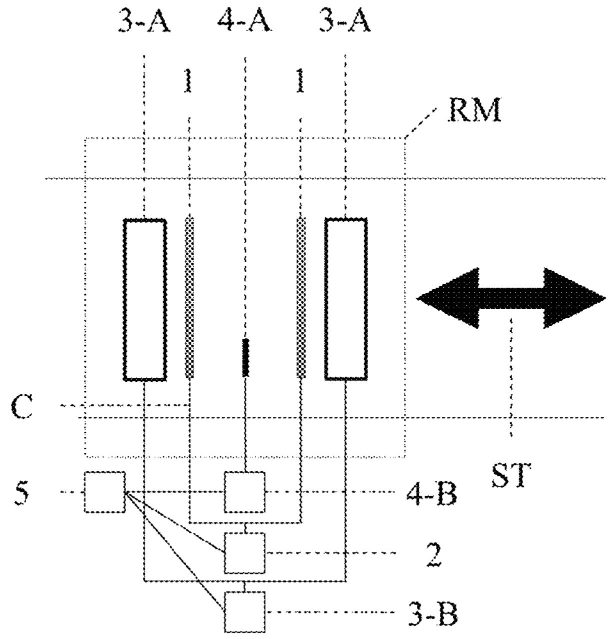
FIG. 5 shows the top view of the installation of the weight sensor (1), temperature probe (4-A), presence probe (3-A) and other equipment used in the system of the present patent.

The set of sensors, weight sensor(s) (1), presence sensor (s) (3) and temperature sensor (4), are installed in the pavement as shown in FIG. 5. The installation configuration of the system's sensors can follow the format shown in FIG. 5 or other positioning variations. When a vehicle travels through a monitoring region (RM), the pavement temperature and the signals proportional to axle weight and vehicle speed are transduced, the aforementioned signals are sent to the information processing and display equipment (5). After mathematical processing, the weight per wheel, per axle, per axle group and the total gross weight of the vehicle are recorded.

FIGS. 5, 6, 7, 8 and 9 exemplify the installation of the sensor on the pavement, showing in detail the sections (I, II, III) with the system components installed: a pavement (P), a rod depth (PH), a trench width (LT), a trench depth—rod section (PTH), a resin (R), flexible rods (1-F-1) or (1-F-2), enclosure (1-E), multipath optical cable (C), a trench depth—casing section (PTI), a multipath optical cable width (LC), also showing the monitoring region (RM) and a traffic direction (ST).

Figure 4:
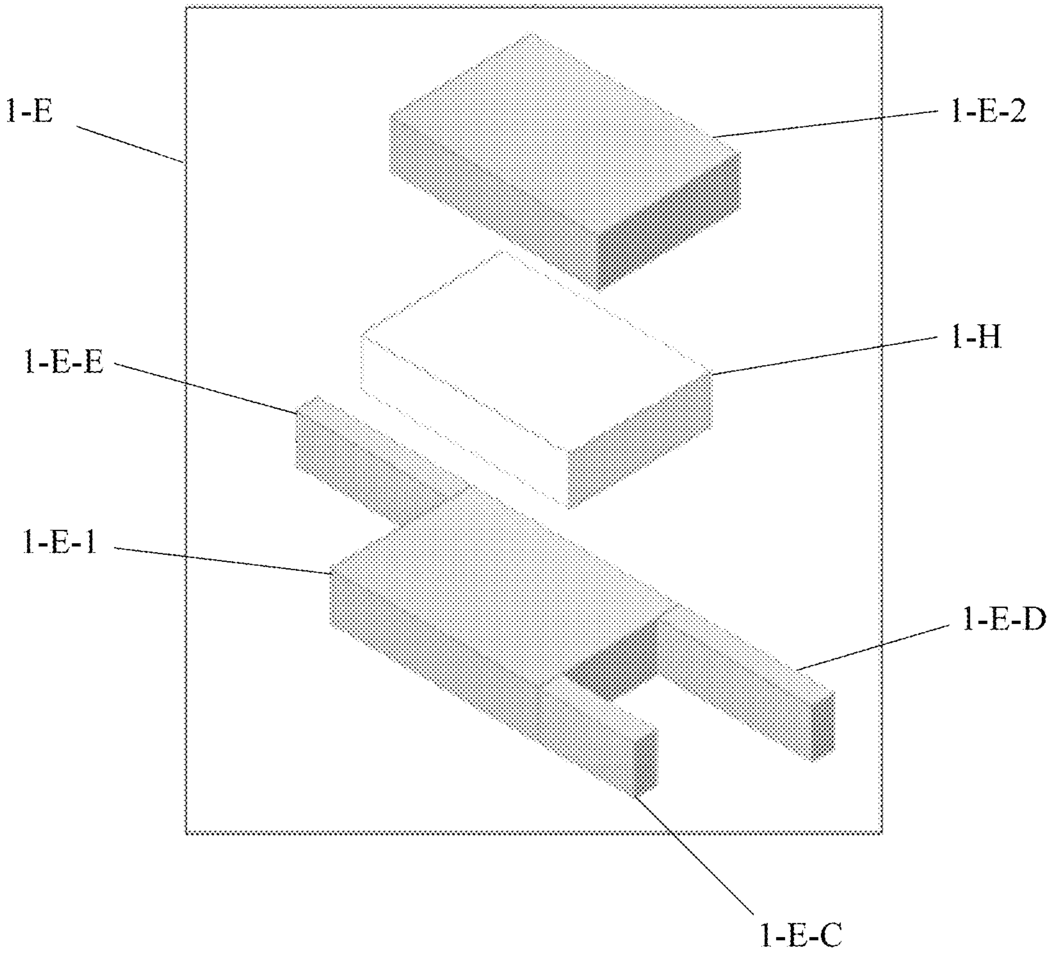
FIG. 4 shows the assembly of the enclosure (1-E) of the weight sensor (1) of the present patent.
Figure 10:
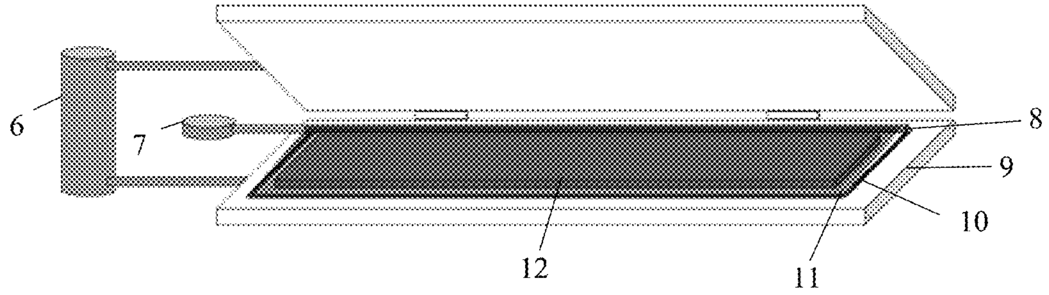
FIG. 10 shows the results of the manufacturing stages of the weight sensor (1) of the present patent.
Figure 11:
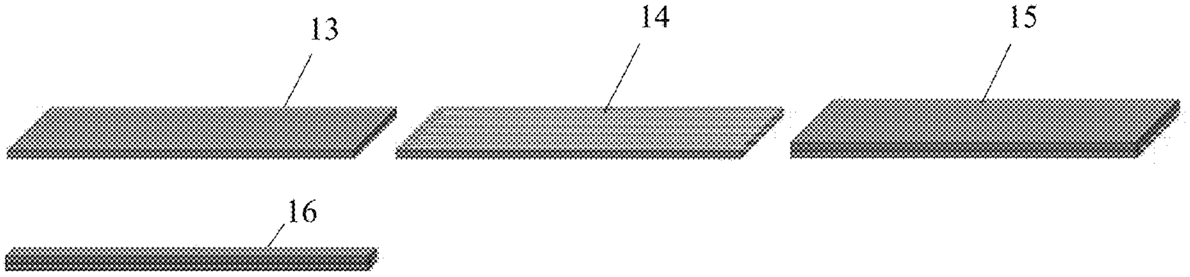
FIG. 11 shows the components used in the manufacturing process of the weight sensor (1) of the present patent.

The system in this patent works in the following sequence:

Aa) The input coupler (1-A-1) and (1-A-2) splits the optical signal generated by the photoemitter (2-A). The portions of this division are directed to the optical sensors (1-D-1) and (1-D-2) for the optical references (1-B-1) and (1-B-2). As the vehicle passes over the apparatus, it exerts forces on the pavement (P) in such a way that these are transmitted to the right flexible rod (1-F-1) and left flexible rod (1-F-2), which are flexed proportionally; the rods (1-F-1) and (1-F-2), in turn, transmit the effort suffered to the optical sensors (1-D-1) and (1-D-2), but not to the optical references (1-B-1) and (1-B-2). The signals from the optical sensors (1-D-1) and (1-D-2) and the optical references (1-B-1) and (1-B-2) are interfered with and the resulting signal emitted by the right output optical coupler (1-C-1) and/or left output optical coupler (1-C-2) is proportional to the forces exerted on the pavement (P) and captured by the photodetector (2-B);

Ab) The photodetector (2-B) circuit transforms the signal from the optical to the electrical domain and has adjustable gain, which allows losses in the optical path to be compensated. The electrical signal is routed to a high-pass filter (2-C);

Ac) The high-pass filter (2-C) removes the low frequencies that cause the electrical signal to fluctuate as a function of temperature. This filtered signal, plus a known DC current level (generated by a clamp (2-D)) is fed to a buffer (2-E);

Ad) The buffer (2-E) transfers a signal from a high-impedance region to a low-impedance region, transmitting the resulting signal in parallel to the peak follower (2-F) and to a Schmitt trigger (2-H);

Ae) The peak follower (2-F) generates a signal copy of the envelope of the signal emitted by the buffer (2-E), which is forwarded to a reference generator (2-G);

Af) The reference generator (2-G) generates dynamic reference voltages, which are based on percentages of the voltage intensity of the signal envelope generated by the peak follower (2-F). These voltages are used as comparison levels for the Schmitt trigger (2-H); and Ag) Using the signals from processes Ad) and Af), the Schmitt trigger (2-H) generates a binary sequence with the same phase and frequency as the signal captured in process Aa). Finally, the binary signal is sent to the information processing and display equipment (5). The weight sensor (1) and its manufacture, are described through the steps of base manufacture Fb), of rod manufacture Fh) and of sensor assembly M), (referencing FIGS. 4, 10 and 11) which are defined below:

Base Manufacture Fb):

Fb1) Cut three rectangles of carbon fiber, glass or aramid, one rectangle of plastic, one rectangle of shading cloth and one rectangle of peel ply;

Fb2) Wax the upper face of a lower mold (9) and remove excess wax with a polisher;

Fb3) Stick a double-sided tape (10) marking out a rectangular area in the center of the lower mold (9). Position a plastic coil (8) on one side and attach a vacuum control system (7) inlet hose;

Fb4) In the center of the area marked out in Fb3), apply three alternating layers of fibrous blanket and epoxy resin. At the top of the stack, apply the peel ply and a shading screen (12). Finish the assembly by sealing the system with a plastic vacuum screen (11) glued to the double-sided tape (10);

Fb5) Close the mold, start the vacuum control system (7) and a temperature control system (6). The vacuum must be maintained for 30 to 40 minutes. The temperature-controlled curing process has stages which are described in Table 1; and

TABLE 1

Timings of the temperature control steps in the curing process.

| Control step | A | B | C | D |
|---|---|---|---|---|
| Initial temperature (° C.) | 30 | 80 | 80 | 100 |
| Final temperature (° C.) | 80 | 80 | 100 | 100 |
| Duration (minutes) | 60 | 60 | 60 | 120 |

Fb6) After the temperature-controlled curing process has finished, wait for the system to reach room temperature. Open the mold, remove the plastic (11), shading screen (12) and peel ply. Remove the manufactured base plate (13) and set it aside on a bench. Remove the plastic spiral (8), the double-sided tape (10) and the vacuum control system hose (7).

Rod Manufacture Fh):

Fh1) Using a template, mark out the areas where the optical fibers will be positioned and the cutting areas. Remove the template and resin the optical fiber over the marked areas. Reserve a base plate with optical fibers (14);

Fh2) Cut three rectangles of fiber blanket (carbon, glass or aramid), one rectangle of plastic, one rectangle of shading fabric and one rectangle of peel ply;

Fh3) Stick double-sided tape (10) marking out a rectangular area in the center of (9). Position a plastic coil (8)

along the length of one of the sides and attach the intake hose of the vacuum control system (7);

Fh4) In the center of the area demarcated in Fh3), assemble the base plate with optical fibers (14) and apply four alternating layers of epoxy resin and three of fibrous blanket. On top of the stack, apply a peel ply and a shading mesh. Finish the assembly by sealing the system with a plastic vacuum screen (11) glued to a double-sided tape (10);

Fh5) Close the mold, start the vacuum control system (7) and the temperature control system (6). The vacuum must be maintained for 30 to 40 minutes. The temperature-controlled curing process has stages which are described in Table 1;

Fhb) After the temperature-controlled curing process has finished, wait for the system to reach room temperature. Open the mold, remove the plastic (11), shading screen (12) and peel ply. Remove the final plate (15) and set aside on the bench. Remove the plastic spiral, double-sided tape and vacuum system hose; and Fh7) Cut the areas demarcated in Fh1) using a suitable cutting process (water jet, laser, emery, or by blades). The result of the cut is the production of rods (16), which can be used as right (1-F-1) or left (1-F-2) flexible rods.

Assembly M) of the weight sensor (1) takes place in the following sequence:

M1) Test the continuity of the optical fibers inside the rods (16) with a laser pen; if the rod is suitable, remove excess wax and varnish it;

M2) Separate the enclosure (1-E);

M3) Mount the tray (1-H) inside it;

M4) Glue the rods (16) to an upper right end of the base of the enclosure (1-E-D) and to a upper left end of the base of the enclosure (1-E-E) with cyanocrylate;

M5) Separate the multipath optical cable (C) at one end, strip off a piece, glue the stripped end of the multipath optical cable (C) to a lower right end of the enclosure base (1-E-C);

M6) Position the input optical couplers (1-A-1) and (1-A-2), output optical couplers (1-C-1) and (1-C-2) and two optical reference sections (1-B-1) and (1-B-2) on the tray (1-H) and splice the optical components;

M7) Fill the enclosure with cushioning material (1-G), siliconized rubber, and glue an enclosure cover (1-E-2) to an enclosure base (1-E-1) with epoxy resin-based two-component adhesive;

M8) Wait for the adhesive to fully cure and test the sensor;

M9) Apply heat shrink to regions the upper right end of the base of the enclosure (1-E-D) and to the upper left end of the base of the enclosure (1-E-E) and to the lower right end of the enclosure base (1-E-C); and M10) Identify the sensor with the serial number and store in an appropriate place.

The invention claimed is:

1. Operating process of the deformation sensor measuring system for dynamic vehicle weighing using fiber optics, wherein the system comprises one or more weight sensor(s) (1) connected to an optical emission and detection equipment (2) via a multipath optical cable (C), the optical emission and detection equipment (2) being connected to an information processing and display equipment (5), and further comprising at least one presence sensor (3) and at least one temperature sensor (4) both connected to the information processing and display equipment (5), wherein the weight sensor (1) comprising an enclosure (1-E) made of a material selected from metal, plastic or composite, filled with a siliconized rubber damping material (1-G) which protects and insulates sensor reference components including a right input optical coupler (1-A-1), a left input optical coupler (1-A-2), a right optical reference (1-B-1), a left optical reference (1-B-2), a right output optical coupler (1-C-1), and a left output optical coupler (1-C-2), said reference components being mounted on a tray (1-H), and further comprising a right flexible rod (1-F-1) and a left flexible rod (1-F-2), made of resin and fiberglass, carbon or aramid composite material, fixed to the enclosure (1-E), wherein the process of operation of the system takes place in the following sequence:

Aa) The input coupler (1-A-1) and (1-A-2) divides the optical signal generated by a photo-emitter (2-A); the portions of this division are directed to optical sensors (1-D-1) and (1-D-2) for the optical references (1-B-1) and (1-B-2); the vehicle, when transiting over the apparatus, exerts forces on the pavement in such a way that these are transmitted to the right flexible rod (1-F-1) and left flexible rod (1-F-2), which are proportionally flexed; the aforementioned rods, in turn, transmit the stress suffered to optical sensors (1-D-1) and (1-D-2), but not to the optical references (1-B-1) and (1-B-2); the signals from the optical sensors (1-D-1) and (1-D-2) and the optical references (1-B-1) and (1-B-2) are interfered with and the resulting signal emitted by the right output optical coupler (1-C-1) and/or left output optical coupler (1-C-2) is proportional to the forces exerted on the pavement and captured by a photodetector (2-B);

Ab) A photodetector (2-B) circuit transforms the signal from the optical to the electrical domain and has adjustable gain, which allows losses in the optical path to be compensated; the electrical signal is routed to a high-pass filter (2-C);

Ac) The high-pass filter (2-C) removes the low frequencies that cause the electrical signal to fluctuate as a function of temperature; this filtered signal, plus a known DC current level generated via a clamper (2-D), is routed to a buffer (2-E);

Ad) The buffer (2-E) transfers a signal from a high-impedance region to a low-impedance region, transmitting the resulting signal in parallel to a peak follower (2-F) and to a Schmitt trigger (2-H);

Ae) The peak follower (2-F) generates a signal copy of the envelope of the signal emitted by the buffer (2-E), which is forwarded to a reference generator (2-G);

Af) The reference generator (2-G) generates dynamic reference voltages, which are based on percentages of the voltage intensity of the signal envelope generated by a peak follower (2-F); these voltages are used as comparison levels for the Schmitt trigger (2-H);

Ag) Using the signals from processes (Ad) and (Af), the Schmitt trigger (2-H) generates a binary sequence with the same phase and frequency as the signal captured in process (Aa); and Ah) Finally, the binary signal together with the signals from a presence sensor (3) and a temperature sensor (4) are sent to the information processing and display equipment (5).

2. In-motion weighing system for motor vehicles based on flexible sensors and fiber optics, wherein the assembly (M), of the weight sensor (1), takes place in the following sequence:

M1) Testing the continuity of the optical fibers inside the rods (16) with a laser pen; if the rod is suitable, removing excess wax and varnish it;

M2) Separating the enclosure (1-E);

M3) Mounting the tray (1-H) inside it;

M4) Gluing the rods (16) to an upper right end of the base of the enclosure (1-E-D) and to a upper left end of the base of the enclosure (1-E-E) with cyanocrylate;

complemented by the following steps:

M5) Separating the multipath optical cable (C) at one end, stripping off a piece, gluing the stripped end of the multipath optical cable (C) to a lower right end of the enclosure base (1-E-C);

M6) Positioning the input optical couplers (1-A-1) and (1-A-2), output optical couplers (1-C-1) and (1-C-2) and two optical reference sections (1-B-1) and (1-B-2) on the tray (1-H) and splicing the optical components;

M7) Filling the enclosure with cushioning material (1-G), siliconized rubber, and gluing an enclosure cover (1-E-2) to an enclosure base (1-E-1) with epoxy resin-based two-component adhesive;

M8) Waiting for the adhesive to fully cure and testing the sensor;

M9) Applying heat shrink to regions the upper right end of the base of the enclosure (1-E-D) and to the upper left end of the base of the enclosure (1-E-E) and to the lower right end of the enclosure base (1-E-C); and M10) Identifying the sensor with the serial number and storing in an appropriate place.

3. The process of claim 1, wherein from the effects inherent in the phenomenon of optical interferometry, the weight sensor (1) captures and uses the physical efforts proportional to the dynamic weight under evaluation.

* * * * *